United States Patent [19]

Fancey et al.

[11] 4,437,254
[45] Mar. 20, 1984

[54] LONGLINE BAITING

[75] Inventors: Everett G. Fancey; John V. Peters; Russell E. Tucker, all of St. John's, Canada

[73] Assignee: Nordco Limited, St. John's, Canada

[21] Appl. No.: 277,912

[22] Filed: Jun. 26, 1981

[51] Int. Cl.³ ............... A01K 79/00; A01K 83/00; A01K 91/00
[52] U.S. Cl. .................................. 43/4; 43/27.4; 43/57.3; 43/43.16
[58] Field of Search ............... 43/4, 4.5, 6.5, 27.4, 43/57.3, 43.16

[56] References Cited

U.S. PATENT DOCUMENTS

| Re. 28,380 | 4/1975 | Tison | 43/6.5 |
|---|---|---|---|
| 1,741,034 | 12/1929 | Newton et al. | 43/43.16 |
| 2,217,928 | 10/1940 | Ward | 43/43.16 |
| 2,511,828 | 6/1950 | Andrist | 43/4 |
| 2,594,387 | 4/1952 | Breuer | 43/43.16 |
| 3,210,883 | 10/1965 | Ulsh | 43/44.83 X |
| 3,377,733 | 4/1968 | Godo | 43/4 |
| 4,015,359 | 4/1977 | Andrews | 43/4 |
| 4,068,399 | 1/1978 | Bjorshol | 43/4.5 |
| 4,250,648 | 2/1981 | Jacobsen | 43/4 |
| 4,354,323 | 10/1982 | Huff | 43/4 |

FOREIGN PATENT DOCUMENTS

| 16974 | 2/1913 | Denmark | 43/4 |
|---|---|---|---|
| 2455707 | 7/1975 | Fed. Rep. of Germany | 43/4 |
| 99224 | 1/1962 | Norway | 43/4 |
| 118016 | 10/1969 | Norway | 43/4 |
| 133053 | 11/1975 | Norway . | |
| 137575 | 12/1977 | Norway . | |
| 139843 | 2/1979 | Norway . | |
| 143045 | 9/1980 | Norway . | |
| 682421 | 11/1952 | United Kingdom | 43/4 |
| 1211901 | 11/1970 | United Kingdom | 43/4 |
| 1562116 | 3/1980 | United Kingdom | 43/27.4 |

OTHER PUBLICATIONS

*World Fishing*, Sep. 1971, pp. 26-27, "New Hope for Longlining".

*Primary Examiner*—Nicholas P. Godici
*Assistant Examiner*—J. Reed Batten, Jr.
*Attorney, Agent, or Firm*—Fetherstonhaugh & Co.

[57] ABSTRACT

A fish hook storage magazine for storing the hooks of a longline during baiting and longline shooting is formed with a slipway for slidably supporting the hooks. The hooks are formed with a spacer which is mounted on the shank of the hook. The slipway and spacer have complementary interlocking profiles which permit lengthwise movement of the spacer with respect to the slipway while preventing removal of the hooks in a direction perpendicular to the slipway and rotation of the hooks about their shank. A bait applying mechanism is also provided which includes a bait support for supporting bait during hooking and a guide for guiding the bait support relative to the hook support to permit relative movement therebetween along a baiting path whereby the bait supported on the bait support is supplied to each hook of a gang of hooks mounted in the magazine. A bait cutting mechanism is also provided for cutting the bait after it is applied to the hooks.

20 Claims, 11 Drawing Figures

4,437,254

LONGLINE BAITING

FIELD OF INVENTION

This invention relates to longline fishing systems. In particular, this invention relates to improvements in the art of baiting of longlines, in a baiter and bait cutting mechanism, in a fish hook and a magazine for storing hooks during baiting and longline shooting.

PRIOR ART

The advantages to be derived from longline fishing are well known to those skilled in the art. However, difficulty has long been experienced in attempting to efficiently and reliably bait the longline hooks. Historically longline hooks have been baited manually one at a time making it an undesirable and time-consuming labour intensive process. This still remains common practice on a world wide basis even in areas of extensive line fishing activity.

Numerous attempts have been made to provide a mechanized baiting system. However, difficulty has been experienced in obtaining a safe and efficient mechanized baiting system which will provide double hooking.

The practice which has been adopted in attempting to automate longline fish hook baiting has been the "flying hook" method wherein hooks are sequentially drawn through a controlled baiting station or a random baiting station. A controlled baiting station is one in which the position of the bait is controlled as the hook passes through the station. A random station is one in which the hook is drawn through a hopper filled with bait and neither the position of the hook nor bait is controlled. Due to the uncontrolled "flying hook" work in close proximity to such a system can be unsafe. In the controlled system, apparatus for ensuring that each piece of bait is moved and positioned to be encountered by each moving hook is costly to manufacture and expensive to maintain.

We have found that the difficulties of the prior art described above can be overcome to a large extent by baiting a gang of hooks which are held fast with respect to one another during baiting.

By holding a plurality of hooks fast in a gang and simultaneously applying bait to all of the hooks in the gang and thereafter, preferably during the actual fishing operation, removing the hooks one at a time from the gang, the baiting of longline hooks can be achieved with a high degree of safety, reliability and speed without the difficulties previously encountered in the "flying hook" system and manual baiting.

In order to permit gang-hooking, we have designed a fish hook which incorporates a spacer which permits hooks which are arranged in a side-by-side relationship to be retained spaced from one another a distance sufficient to permit bait portions of adequate proportion to be located on each hook.

According to one aspect of the present invention, a fish hook for gang baiting comprises a body having a shank at one end thereof and a head portion extending in a first plane from the shank to a sharpened free end and a spacer on the shank, the spacer having at least one lateral projection extending in said first plane whereby a plurality of said hooks arranged in a side-by-side relationship will have their head portions spaced by engagement of the shoulders of adjacent spacers.

In order to releasably retain a plurality of fish hooks in a gang for baiting and provide such baiting, we have provided a fish hook baiter.

According to a further aspect of the present invention, a fish hook baiter comprises hook support means adapted to support a gang of hooks in a side-by-side spaced relationship which is fixed for baiting with their hook ends free for baiting, bait support means adapted to support bait during hooking of the bait and guide means interconnecting the bait support means and the hook support means and adapted to permit relative movement therebetween along a baiting path whereby bait supported on the bait support means is applied to each of the hooks in the gang of hooks.

According to yet another aspect of the present invention, a fish hook baiter for baiting hooks of the type having a body portion formed to provide a shank and a crook-shaped head portion extending in a first plane to a sharpened free end and a T-shaped spacer at the other end of said shank portion, the crook-shaped head portions having a hooking axis extending normal to the first plane and located inwardly of the crook configuration, comprises a hook support means comprising a magazine having a hook mounting slipway opening inwardly from one end thereof and extending across said support means, said slipway being adapted to slidably receive and releasably retain the spacers of a gang of hooks with the head portions projecting upwardly therefrom at a plurality of laterally spaced hooking locations across said support means with their sharpened free ends extending in a first direction and their hooking axes aligned on a first axis whereby hooks may be slidably loaded and unloaded with respect to said slipway through said one end, first register means on said magazine for use in positioning said magazine, guide means comprising a frame having a pair of oppositely dispoed end plates each having second register means adapted to cooperate with said first register means of said magazine to locate said magazine in a baiting station with said first axis extending between said end plates, a cam track formed on said end plates, said cam track having an arcuate section generated from said first axis, said arcuate section extending above said first axis and having an extension at one end thereof which projects to a level disposed a substantial distance below said first axis so as to form a ramp section which is upwardly inclined from its lower end to the arcuate section at a tangent thereto, a pair of actuator arms arranged one at each end plate, each actuator arm having a first end pivotably mounted on its adjacent end plate for rotation about said first axis and extending outwardly therefrom, a support shaft extending between and mounted on said actuator arms, said support shaft being fixed against rotation relative to said actuator arms while being free to slide radially with respect to said second axis, and cam follower means mounted on said support shaft and engaging said cam track for movement therealong between a lowered position in which the cam followers are located at said lower end of said ramp section to a raised position which is more than 90° removed from said lowered position, a bait support platform mounted on said support shaft and extending generally radially therefrom, said platform being substantially horizontally disposed and extending to underlie said first axis when said support shaft is in said lowered position and being movable in response to movement of said actuator means to be initially ramped upwardly while remaining horizontally disposed and thereafter to pivot about said first axis through an arc of at least 90° whereby bait located on said platform is initially elevated to simultaneously contact the sharpened ends of a gang of hooks mounted on said hook support magazine and subsequently rotated in response to rotation of the bait support platform about said first axis to direct the bait around the crook-shaped end of the hooks to a sufficient extent to cause double-hooking, a cutter blade assembly comprising a scabbard plate extending transversely between and mounted on said end plates for movement between a retracted position permitting unrestricted movement of said bait support platform and a bait cutting position underlying said platform, a plurality of cutter blades mounted on said scabbard plate for movement from a sheathed position within said scabbard plate and an arc extending through said hooking station, one of said blades extending between each adjacent hooking location whereby bait which is hooked may be cut into individual bait portions after hooking.

According to yet another aspect of the present invention, there is provided a longline baiting method for baiting hooks which are connected by snood lines at spaced points along the length thereof comprising the steps of locating adjacent hooks of a longline in a side-by-side laterally spaced relationship in a row with their crook-shaped head portions aligned and their pointed ends exposed for baiting to form a gang of hooks, retaining said gang of hooks in a fixed position with respect to one another and simultaneously hooking the gang of hooks into bait while they are retained in said fixed position.

The invention will be more clearly understood after reference to the following detailed specification read in conjunction with the accompanying drawings wherein, FIG. 1 is an exploded pictorial view of a fish hook baiter constructed in accordance with an embodiment of the present invention;

FIG. 1a is a side view of a fish hook constructed in accordance with an embodiment of the present invention;

FIG. 1b is a front view of the fish hook of FIG. 1a;

FISH HOOK

Figure 1:
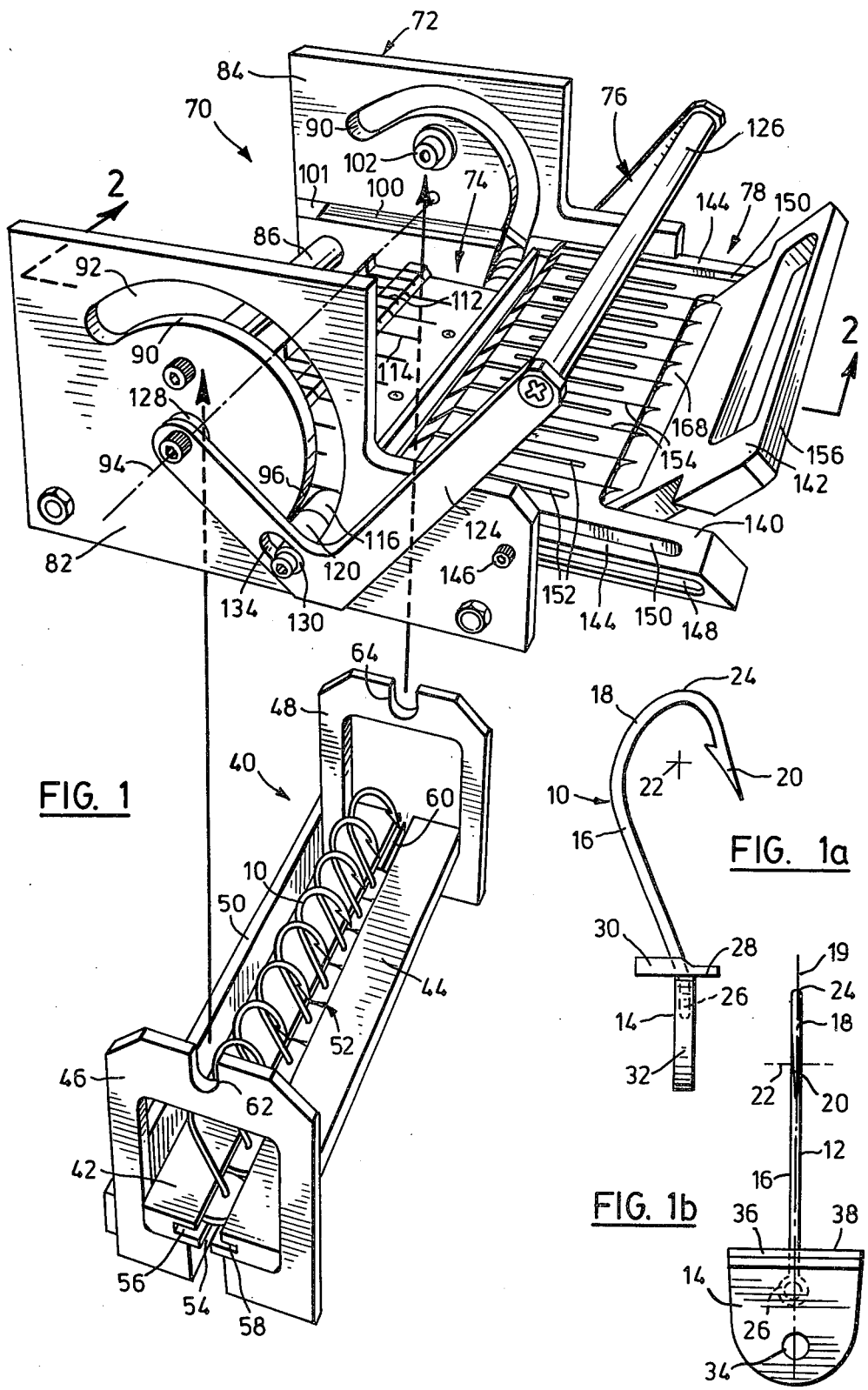

With reference to FIG. 1a of the drawings, the reference numeral 10 refers generally to a fish hook constructed in accordance with an embodiment of the present invention. The fish hook comprises a body 12 and a spacer 14. The body 12 is of a conventional fish hook configuration and has a shank portion 16 and a crook-shaped head portion 18 extending to a sharpened free end 20 at which a barb is located. The shank and head portion of the body 12 extends in a first plane 19 and a hooking axis 22 extends normal to the plane 19 within the confines of the crook-shaped head 18. It will be understood that the crook-shaped head portion of the hook is not generated in an arc extending from this axis. However, the axis is to be found in an area about which bait moving along the body of the hook from the free end thereof would generally rotate.

In the baiting of fish hooks it is important for the purposes of ensuring that the bait is securely positioned on the hook to ensure that the bait is "double-hooked". Double-hooking in this context means moving the bait onto the hook to an extent sufficient to ensure that at least a major portion of the bait is located on the shank side of the apex 24 of the crook-shaped head. At the other end of the shank 16 the eye 26 is embedded in the spacer 14. The spacer 14 is generally T-shape in side view as shown in FIG. 1a and has a short shoulder 28 and a long shoulder 30 projecting from opposite sides of the leg portion 32 thereof. A line mounting passage 34 is formed in the spacer 14.

It will be understood that the hook body 12 may be in the form of any number of conventional hook configurations and may be made from any material which fish hooks are conventionally made. The spacers 14 may be made from a rigid plastics material such as polyurethane and are formed by moulding in situ about the hook.

HOOK SUPPORT MAGAZINE

With reference to FIG. 1 of the drawings, the reference numeral 40 refers generally to a hook support magazine in which a plurality of hooks are located prior to the application of bait thereto. The magazine 40 consists of a pair of guide rails 42 and 44 which are mounted on bridge members 46 and 48 which are connected by means of a brace bar 50. A slipway generally identified by the reference numeral 52 is formed between the oppositely disposed side edges of the guide rails 42 and 44. The slipway includes a central passage 54 which opens upwardly and downwardly between the rails 42 and 44 and slots 56 and 58 which are formed in the side edges of the rails 42 and 44 respectively and which extend over the full length thereof. The slots 56 and 58 are proportioned to slidably receive the long shoulder 30 and the short shoulder 28 respectively of the hook spacer 14. A stop pin 60 is mounted on the rail 42 at one end of the slipway 52 and projects across the slipway to effectively close one end of the slipway.

As shown in FIG. 1, the hooks 10 are mounted in the slipway 52 in a side-by-side relationship with the laterally projecting portions 36 and 38 of adjacent hooks abutting one another to maintain the head portions 12 in a spaced parallel relationship. By proportioning the shoulders 28 and 30 and the slots 56 and 58 to be of different sizes, it is possible to ensure that the hooks can only enter the slipway when arranged in the required position with the hooking axes 22 aligned and the sharpened ends pointing in one direction and exposed for baiting.

The bridge members 46 and 48 have first register slots 62 and 64 formed in the upper edge thereof which, as will be described hereinafter, are used for the purpose of aligning the magazine 40 with respect to baiter assembly 70.

FISH HOOK BAITER

The baiter assembly 70 comprises a support frame 72, a bait support platform 74, an actuator mechanism 76 and a bait cutter assembly 78.

Figure 2:
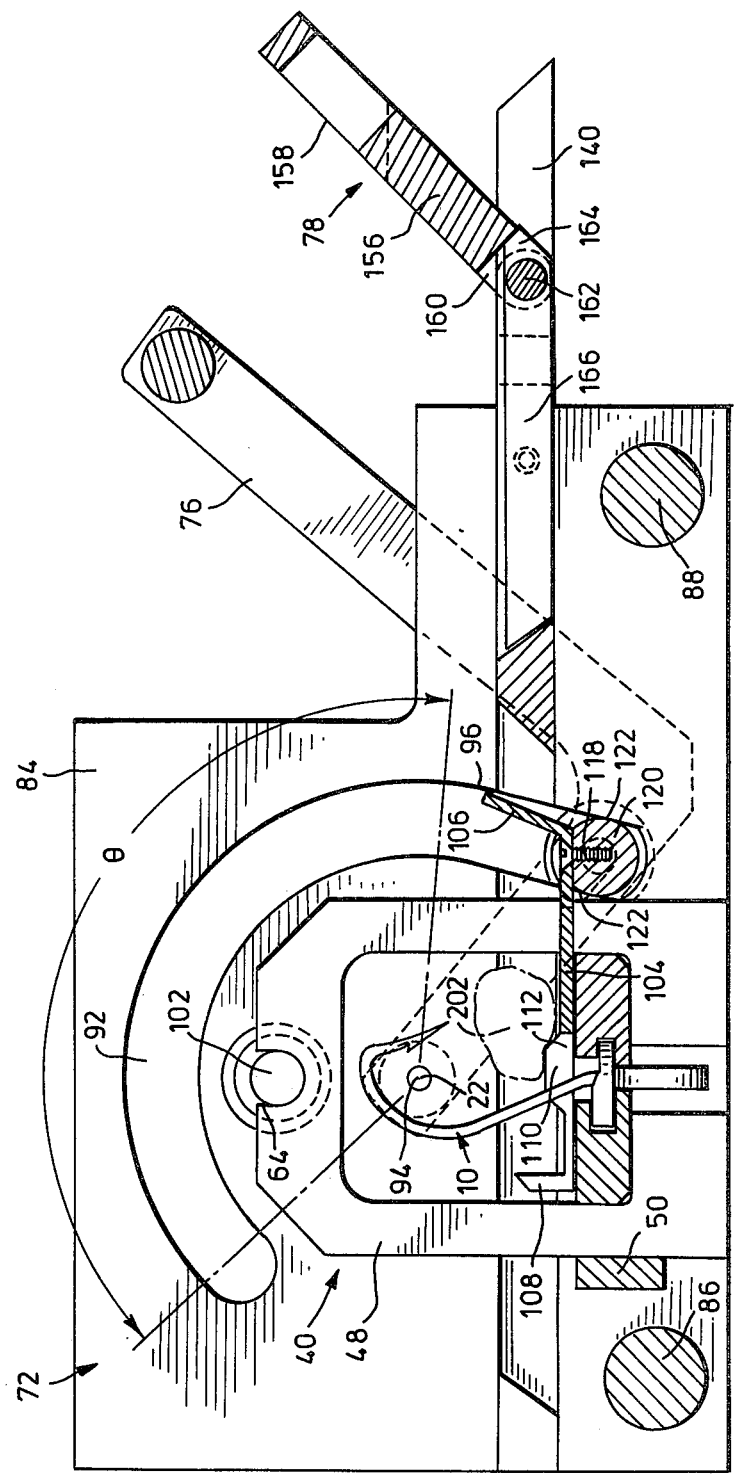
FIG. 2 is a sectional side view of the assembled fish hook baiter of FIG. 1 taken along the line 2—2 of FIG. 1.

The support frame 72 comprises oppositely disposed end plates 82 and 84 which are supported in a spaced parallel relationship by means of spacer bars 86 and 88 (FIG. 2). Cam tracks 90 are formed in the end plates 82 and 84 and include an arcuate section 92 generated from a first axis 94 and a straight section 96 which extends tangentially with respect to the arcuate section. The arcuate section 92 extends upwardly from the straight section 96 through an angle $\theta$ which in the embodiment illustrated in the drawings measures approximately 148 degrees.

A pair of oppositely disposed slots 100 are formed in the inner faces of the end plates 82 and 84 to receive the side edges of the bait cutter assembly 78 as will be described hereinafter.

Second register pins 102 project inwardly from the end plates 82 and 84 and are adapted to fit within the first register slots 62 and 64 and serve to align the magazine 40 with the frame 72.

BAIT SUPPORT PLATFORM

The bait support platform 74 is in the form of a tray which has a bottom wall 104, a back wall 106 and a front wall 108. A ridge 110 extends across the width of the tray and hook receiving slots 112 extend inwardly from the front edge 108 to the ridge 110. Knife receiving slots 114 extend inwardly from the front wall 108. The knife receiving slots 114 are located equidistant between each adjacent pair of hook receiving slots 112. The bait support platform 74 has a width which is less than the distance between the oppositely disposed end plates 82 and 84 by an amount sufficient to permit the bridge members 46 and 48 to extend between the opposite ends of platform 74 and the adjacent end plates 82 and 84. The platform 74 is preferably in the form of a rigid metal structure capable of transmitting sufficient pressure to the bait during the baiting operation. The platform 74 is mounted on a shaft 116 by means of a plurality of mounting screws 118. Cam followers 120 are mounted at opposite ends of the shaft 116 and are secured against rotation relative to the shaft 116 by means of conventional grub screws (not shown). The cam followers 120 have oppositely disposed flats 122 which bear against the sides of the cam track 90 so as to prevent rotation of the followers 120 and thereby prevent rotation of the shaft 116 which in turn maintains the position of the bottom wall 104 of the platform in a fixed relationship with respect to the flats 122 of the cam follower 120. Thus it will be seen that the orientation of the platform 104 is dependent upon the orientation of the flats 122 of the cam follower which is in turn dependent upon the position of the cam follower 120 along the length of the cam follower. As shown in FIG. 2 of the drawings, when the cam follower 120 is located at the lower end of the straight section 96 of the cam track 90, the bottom wall 104 of the platform is horizontally oriented and it will remain horizontally oriented during travel of the cam follower 120 upwardly along the straight section 96 of the cam track 90.

ACTUATOR MECHANISM

The actuator mechanism 76 comprises a pair of bell-crank levers 124 and a manually engageable support bar 126 which connects opposite ends of the lever arms 124. The other ends of the bell-crank levers 124 are mounted for rotation about the first axis 94 on stub shafts 128 which are supported by the end plates 82 and 84 of the frame 72. Opposite ends 130 of the shaft 116 on which the bait platform is mounted are located in elongated slots 134 formed in the bell-crank levers 124. The slots 134 extend radially from the first axis 94 and serve to permit the cam followers 120 to follow the profile of the cam track during movement along the straight section 96 thereof.

BAIT CUTTER ASSEMBLY

Figure 3:
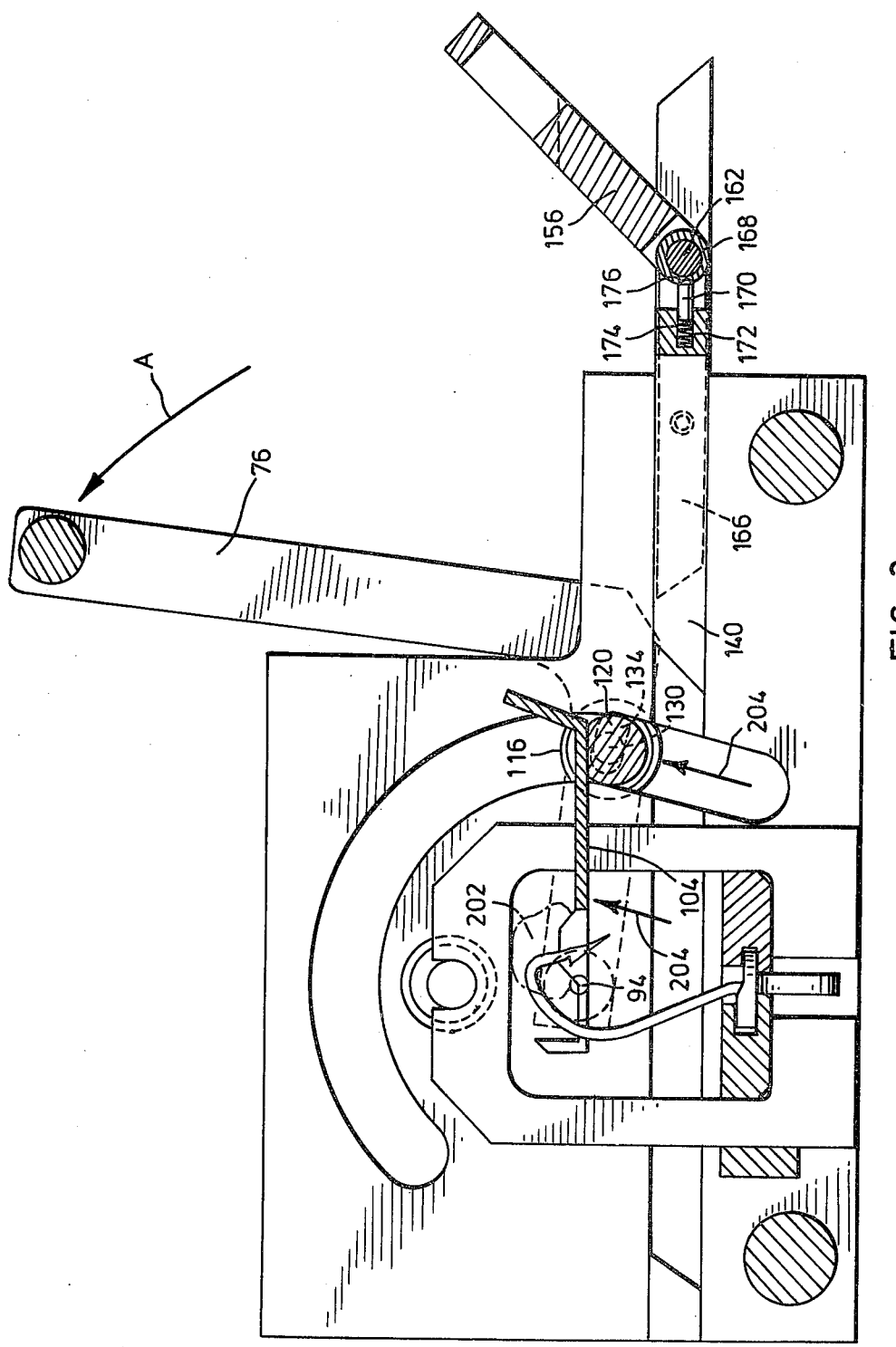
FIGS. 3, 4, 5 and 6 are sectional side views similar to FIG. 2 showing successive steps in the position of the baiter during the baiting operation.
Figure 5:
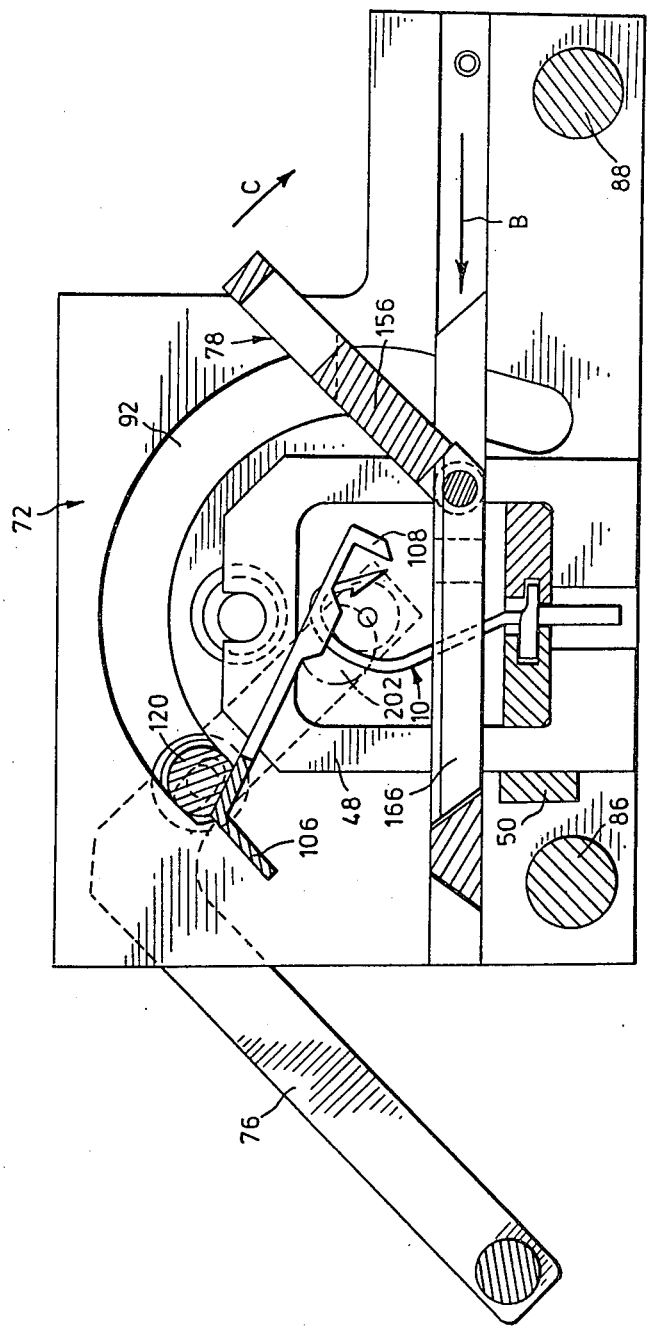
Figure 6:
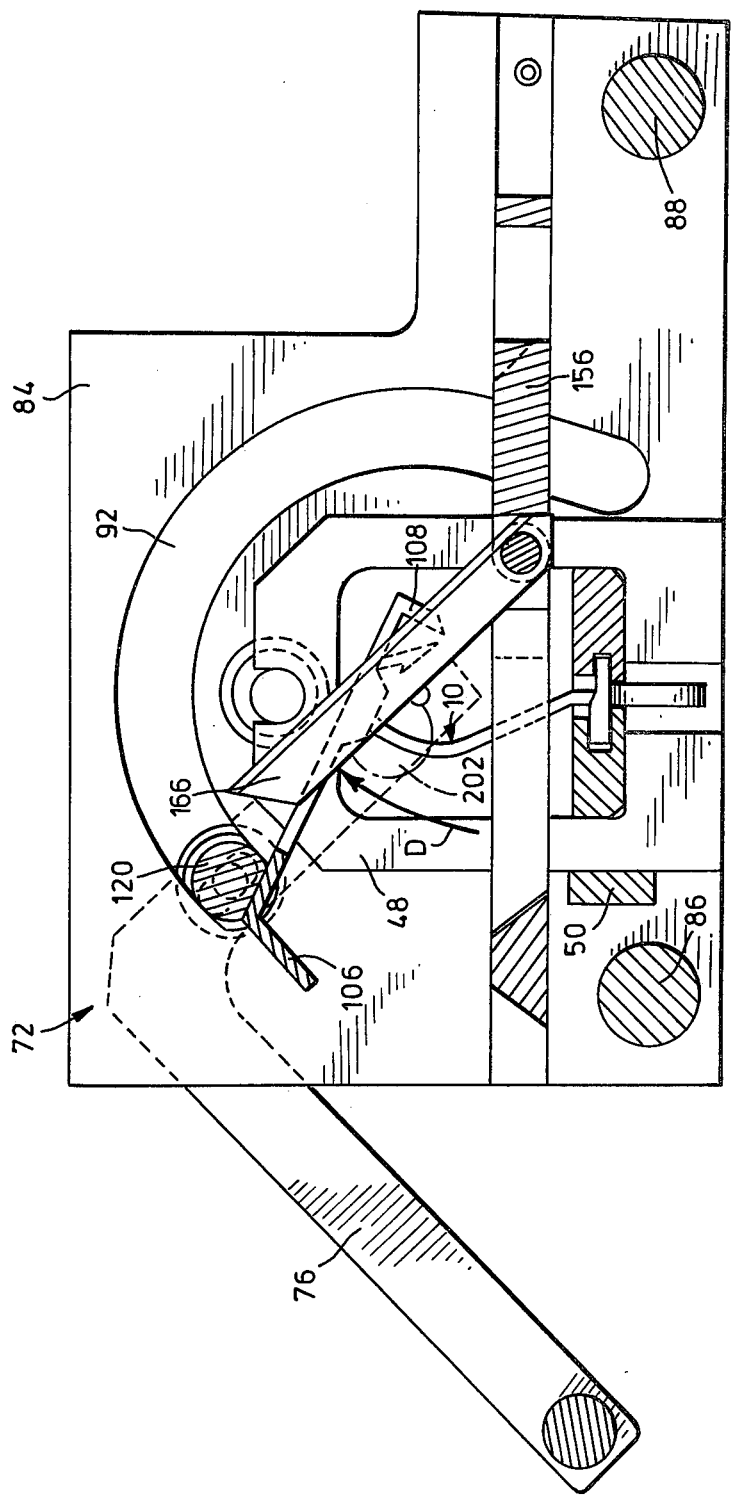

The cutter assembly 78 comprises a scabbard plate 140 and a cutter blade assembly 142. The scabbard plate 140 has a pair of oppositely disposed side rails 144 proportioned to fit in a close fitting sliding relationship within the slots 100 of the end plates 82 and 84. The scabbard plate 140 is proportioned so as to be slidable along the slots 100 between a retracted position shown in FIGS. 1 through 4 of the drawings and an operable position shown in FIGS. 5 and 6 of the drawings. In the retracted position shown in FIG. 1 of the drawings, a stop pin 146 extends into a slot 148 on the side faces of the side rails 144. Stops 101 at the other end of the slots 100 form a stop limiting the forward movement of the scabbard plate 140. Slots 150 extend inwardly from the inner edge of the scabbard plate 140 to receive the bridge plates 48 of the hook magazine 40 therebetween such that the scabbard plate 140 can be moved between the retracted position and the operable position while the magazine 40 is operably positioned in the frame 72. Hook slots 152 also extend inwardly from the inner edge of the scabbard plate 140 and are arranged to be aligned with the hook slots 112 of the bait platform. Knife slots 154 extend inwardly from the back edge of the scabbard plate and are aligned with the knife slots 114 of the bait platform. The cutter blade assembly 142 comprises a manually engageable handle 156 which has a hand opening 158 formed at one edge thereof and a recess 160 formed at the other edge thereof. A shaft 162 has its opposite ends pivotally mounted in shoulders 164 which are formed at opposite ends of the recess 160. The shaft 162 is fixed against rotation with respect to the handle 156 and a plurality of cutter blades 166 are mounted on the shaft 162 and project radially outwardly therefrom in a fixed angular relationship with respect to the handle 156 such that when the handle 156 is in the elevated position shown in FIG. 1, the cutter blades 166 are located within the knife slots 154 and when the handle 156 is in the lowered position shown in FIG. 6, the knife blades project upwardly from the scabbard plate. The knife blades 166 are maintained in a spaced relationship on shaft 162 by spacer sleeves 168. As shown in FIG. 3 of the drawings, detent pins 170 are mounted in recesses 172 formed in the scabbard plate and are urged outwardly therefrom by a compression spring 174. When the handle 156 is in the position shown in FIG. 3, the detent pins 170 extend into dimples 176 formed in the sleeves 168 which are fast with respect to the shaft 162. Thus, the detent pins 170 will normally retain the handle 156 in the position shown in FIG. 3 in which the cutter blades 166 are positioned in the slots 154 of the scabbard plate 140. The handle 156 can be moved, as previously described, by the application of sufficient force to cause the detent pins 170 to be driven out of the dimples 176.

METHOD OF USE

In the use of the baiter mechanism of the embodiment described above, it is necessary to carry out a number of steps including the loading of the fish hooks into the magazine, the mounting of the loaded magazine within the baiter, the hooking of the bait, the cutting of the bait to individual bait portions, the removal of the magazine from the baiter and the shooting of the baited hooks from the magazine.

MAGAZINE LOADING

Figure 7:
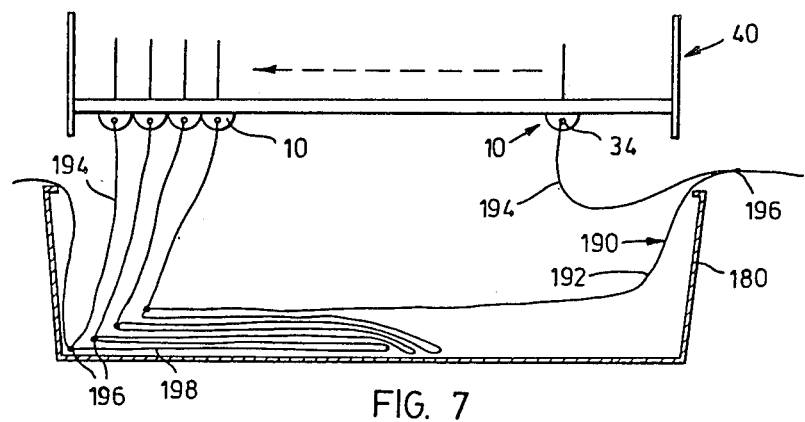
FIG. 7 is a side view of a hook support magazine with a line support tray disposed therebelow.
Figure 8:
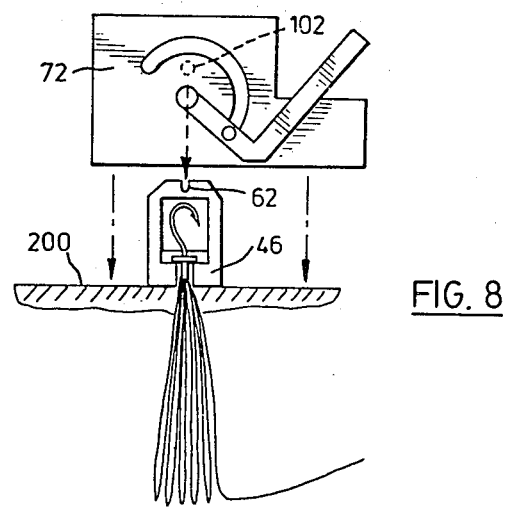
FIG. 8 is a side view illustrating the manner in which the baiter mechanism is mounted on the magazine prior to baiting.

A method of loading the magazine is illustrated in FIG. 7 of the drawings wherein it will be seen that the hook support magazine 40 is located above a line support tray 180. Fishing line which is generally identified by the reference numeral 190 comprises a longline portion 192 to which a plurality of snood lines 194 are connected at spaced points 196 along the length thereof. The snood lines 194 are connected to the line mounting passages 34 of the hooks 10. Successive hooks of the longline are then inserted one at a time into the open end of the slipway of the magazine with their snood lines 194 depending therefrom and the portions of the longline 192 which are located between adjacent points 196 folded to form loops 198 which are stacked within the tray 180 in a manner to facilitate the rapid pay-out of the longline. The first fish hook which is inserted in the slipway comes to rest against the stock pin 60 and the body portions of successive hooks are spaced around one another by the laterally projecting portions 36 and 38 of their spacers 14. Thus, the spacers 14 locate the body portions of the hooks in the required spaced relationship to be aligned with the hook slots 112 of the bait platform and the hook slots 152 of the bait cutter assembly 78. After the hooks have been positioned in the magazine, the bridge members 46 and 48 of the magazine are supported on a suitable support surface 200 and the support frame 72 is lowered onto the magazine as shown in FIG. 8 to position the second register pins 102 in the first register slots 62 and 64.

As a result, the magazine 40 is located relative to the support frame 72 in the position shown in FIG. 2 of the drawings in which the first axis 94 is coincident with the hooking axis 22 of the hooks 10. The actuator mechanism is positioned so that the cam followers 120 are located at the lower end of the cam track 90 in which position the bait plaform is horizontally oriented. It will also be noted that the cutter mechanism 78 is located in its retracted position.

Bait 202 is, then, positioned on the bottom wall 104 of the platform, as shown in broken lines in FIG. 2, to be located in the baiting station with respect to the pointed ends of the hooks. The bait 202 is preferably in the form of a slab of frozen bait, such as squid or the like, which is of sufficient length to extend a substantial distance across the platform so as to underlie a plurality of hooks. The bait may have a configuration such that it will extend across the full width of the platform or two or more lengths of bait may be positioned end-to-end on the platform to extend across the full width thereof.

The various steps in the baiting of the hooks are illustrated in FIGS. 3, 4, 5 and 6 of the drawings.

Initially, the actuaor mechanism 76 is manually engaged and moved in the direction of the arrow A from the position shown in FIG. 2 to the position shown in FIG. 3. As a result, the bell-crank levers 124 pivot about the first axis 94. This movement causes the ends 130 of the shaft 116 to slide along the slots 134 of the bell-crank lever arms. Thus, the bottom wall 104 of the platform remains horizontal and lifts the bait 202 toward and onto the hooks in the direction of the arrows 204. The straight portion of the cam track has a sufficient length to ensure that during direct lifting of the bait it will be impaled on the hook to a sufficient extent to ensure that the sharpened end of the hook projects through the bait.

Figure 4:
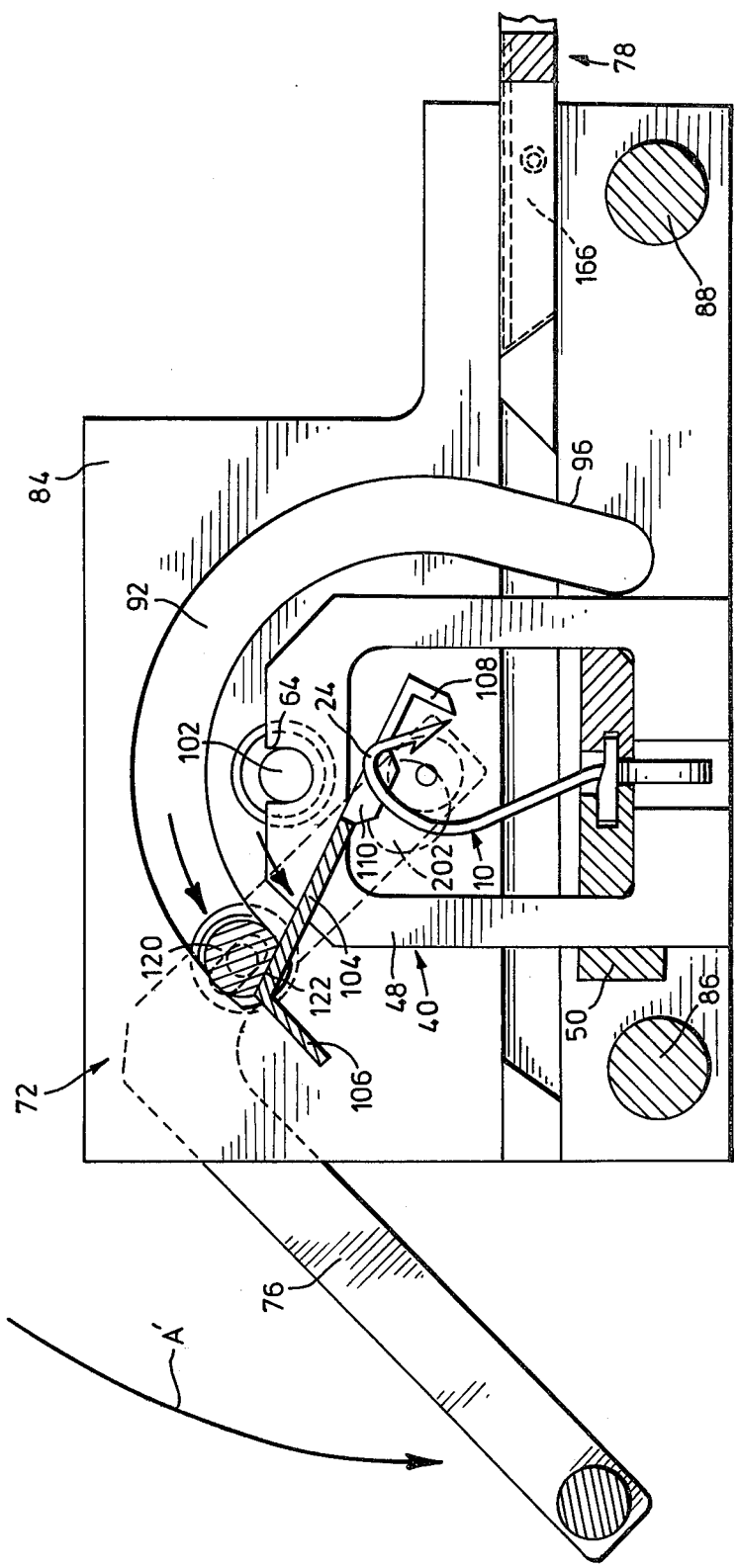

Continued rotation of the actuator mechanism 76 in the direction of the arrow A to the position shown in FIG. 4 causes the bait to be driven along the body of the hook and to pass over the apex 24 thereby achieving "double hooking".

Figure 9:
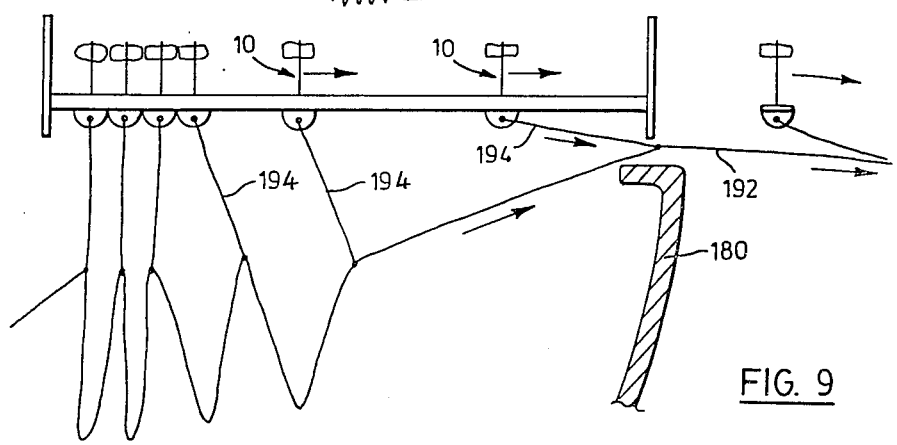
FIG. 9 is a side view of a magazine and support tray illustrating the manner in which the baited hooks are shot from the magazine as the line is paid out.

As previously indicated, the bait 202 may be in the form of a unitary body and it is necessary to cut the bait into individual bait portions. This is achieved by moving the bait cutter assembly 78 from the position shown in FIG. 2 to the position shown in FIG. 5 by sliding it along the frame 72 in the direction of the arrow B. The manually engageable handle 156 is then pivoted in the direction of the arrow C illustrated in FIG. 5 to the position shown in FIG. 6 which automatically causes the cutter blades 166 to rotate in the direction of the arrow D to extend in an arc through the baiting station and thereby cut the bait 202 into a plurality of bait portions which have the proportions generally indicated in FIG. 9 of the drawings. The handle 156 of the cutter blade assembly is then returned to the position shown in FIG. 5 and the cutter blade assembly withdrawn to its retracted position shown in FIGS. 3 and 4 whereupon the support frame is raised from the magazine and the magazine with its baited hooks is then ready for use in a longline fishing operation. As shown in FIG. 9 of the drawings, the baited hooks 10 are discharged from the magazine through the open end of the slipway as a result of the force transmitted by the main line 192 to the snood lines 194.

From the foregoing, it will be apparent that the apparatus of the present invention provides a fish hook construction which facilitates the positioning of the fish hooks in a spaced relationship in a magazine and permits the sliding mounting and removal of the fish hooks from the magazine. In addition, a magazine loaded with fish hooks provides a convenient holder for fish hooks during the baiting of the fish hooks and during the shooting of the baited hooks. Furthermore, the baiting apparatus of the present invention provides a simple and efficient apparatus which permits bait to be applied to the hooks and permits "double hooking" in a simple, high speed baiting operation. Furthermore, the apparatus provides a mechanism which permits whole fish or slabs of bait to be cut into individual bait portions after the hooks are baited with the large slabs.

It has been found that there are considerable advantages to be derived from the baiting of hooks arranged in a gang with a slab of bait or whole fish which, subsequent to double hooking, is cut to provide individual bait portions. These advantages include the fact that the hooks may be held in a fixed position with respect to one another and may be stationary while the large slab of bait is applied thereto. It will, of course, be understood that one could move the gang of hooks as a unit relative to the bait. The concept of "gang hooking" does, however, permit baiting of hooks without requiring the individual hooks to be in motion during the baiting operation, thereby eliminating the need for the "flying hook" in the baiting operation. Furthermore, the mechanism of the present invention lends itself to the baiting of a plurality of loaded magazines; that is to say, a plurality of magazines may be loaded with hooks and each loaded magazine introduced to a baiting mechanism, baited and removed from the baiter to be replaced by a subsequent magazine. Thus, it is possible to preload a large number of magazines in an on-shore baiting establishment or on board a fishing boat.

It will also be apparent that the tab of the fish hook and the slipway may be constructed such that the slots are formed in the tab and the slipaway has rails which extend into the slots.

Various other modifications of the present invention will be apparent to those skilled in the art without departing from the scope of the invention. For example, it will be understood that while the apparatus illustrated in the drawings of the present application is designed to accommodate nine fish hooks, the magazine may have a much larger capacity. Furthermore, the magazine and the tray 180 which serves to support the longlines may be interconnected or formed as a unitary body. In addition it will be apparent that a power operated mechanism may be provided for the purpose of driving the bait tray relative to the hooks and for driving the cutter mechanism between an operative and inoperative position. The cutter mechanism may alternatively be in the form of a circular cutter. Furthermore, it may not be essential to arrange the first axis 94 coincident with the hooking axis 22 of the hooks 10 in order to achieve the required double-hooking. Surprisingly, it was discovered that initial movement of the bait with respect to the hooks in a direction which is inclined away from the inclined leading end portion of the hook provided a better initial hooking action than was achieved by driving the bait toward the hook in the direction of the inclined leading end. These and other modifications of the present invention will be apparent to those skilled in the art.

What we claim as our invention is:

1. A fish hook baiter comprising,
   (a) a hook support means having a hook supporting portion of its length adapted to support a gang of hooks in a side-by-side spaced relationship which is fixed for baiting with their hook ends free for baiting,
   (b) bait support means adapted to support bait during hooking of the bait, said bait support means being disposed laterally opposite and co-extensive with at least a portion of said hook supporting portion of said hook support means,
   (c) guide means engaging said bait support means and adapted to guide the bait support means along a baiting path whereby bait supported on the bait support means is applied substantially simultaneously to a plurality of the hooks in the gang of hooks.

2. A fish hook baiter as claimed in claim 1 further comprising cutter means mounted for movement relative to said bait support means for cutting the bait.

3. A fish hook baiter is claimed in claim 1 wherein said hook support means is in the form of a magazine which is removable for loading and unloading of hooks.

4. A fish hook baiter as claimed in claim 1 for use in supporting a gang of hooks each having a spacer located on its shank portion, said hook support means comprises a magazine having a hook mounting slipway opening inwardly from one end thereof and extending across said hook support means, said slipway being adapted to slidably receive and releasably retain the spacers of a gang of hooks with the head portions projecting upwardly therefrom at a plurality of laterally spaced hooking locations across said support means with their sharpened free end extending in a first direction and exposed for baiting and their hooking axes aligned on a first axis whereby hooks may be slidably loaded and unloaded with respect to said slipway through one said end.

5. A hook baiter as claimed in claim 4 wherein said magazine is formed with first registering means for use in positioning said magazine with respect to said guide means.

6. A fish hook baiter as claimed in claim 1 wherein said guide means comprises,
   (i) a frame having a pair of oppositely disposed end plates adapted to cooperate with said hook support means to locate said hook support means in a baiting station for supporting a plurality of hooks with their hooking axes aligned on a first axis extending between said end plates,
   (ii) a cam track formed on said end plates, said cam track having an arcuate section generated from said first axis, said arcuate section extending above said first axis and having an extension at one end thereof which projects to a level disposed a substantial distance below said first axis so as to form a ramp section which is upwardly inclined from its lower end to its arcuate section at a tangent thereto,
   (iii) a pair of actuator arms arranged one on each end plate, each actuator arm having a first end pivotably mounted on its adjacent end plate for rotation about said first axis and extending outwardly therefrom,
   (iv) a support shaft extending between and mounted on said actuator arms, said support shaft being fixed against rotation relative to said actuator arms while being free to slide radially with respect to said second axis and,
   (v) cam forward means mounted on said support shaft and engaging said cam track from movement therealong between a lowered position in which the cam followers are located at the lower end of the ramp section to a raised position which is more than 90° removed from the lowered position.

7. A fish hook baiter as claimed in claim 6 wherein said bait support means comprises a bait support platform mounted on said support shaft and extending generally radially therefrom, said platform being substantially horizontally disposed and extending to underlie said first axis when said support shaft is in said lowered position and being movable in response to movement of said actuator means to be initially ramped upwardly while remaining horizontally disposed and thereafter to pivot about said first axis to an arc of at least 90° whereby bait located on said platform is initially elevated to simultaneously contact the sharpened ends of a gang of hooks mounted on said hook support magazine in use and subsequently to rotate in response to rotation of the bait support platform about said axis to direct the bait around the crook-shaped end of the hooks to a sufficient extent to cause double-hooking.

8. A fish hook baiter as claimed in claim 2, wherein said cutter means comprises a cutter plate assembly comprising,
   (i) a scabbard plate,
   (ii) a plurality of cutter blades mounted on said scabbard plate for movement from a sheathed position within said scabbard plate in an arc extending through said hooking station, one of said blades extending between each adjacent hooking location whereby bait which is hooked may be cut in individual bait portions after hooking.

9. A fish hook baiter for baiting hooks of the type having a body portion formed to provide a shank and a crook-shaped head portion extending in a first plane to a sharpened free end and a T-shaped spacer at the other end of said shank portion, the crook-shaped head portions having a hooking axis extending normal to the first plane and located inwardly of the crook configuration, said baiter comprising, (a) a hook support means comprising,
  (i) a magazine having a hook mounting slipway opening inwardly from one end thereof and extending across said support means, said slipway being adapted to slidably receive and releasably retain the spacers of a gang of hooks with the head portions projecting upwardly therefrom at a plurality of laterally spaced hooking locations across said support means with their sharpened free ends extending in a first direction and their hooking axes aligned on a first axis whereby hooks may be slidably loaded and unloaded with respect to said slipway through said one end,
  (ii) first register means on said magazine for use in positioning said magazine,
(b) guide means comprising,
  (i) a frame having a pair of oppositely disposed end plates each having second register means adapted to cooperate with said first register means of said magazine to locate said magazine in a baiting station with said first axis extending between said end plates,
  (ii) a cam track formed on said end plates, said cam track having an arcuate section generated from said first axis, said arcuate section extending above said first axis and having an extension at one end thereof which projects to a level disposed a substantial distance below said first axis so as to form a ramp section which is upwardly inclined from its lower end to the arcuate section at a tangent thereto,
  (iii) a pair of actuator arms arranged one at each end plate, each actuator arm having a first end pivotably mounted on its adjacent end plate for rotation about said first axis and extending outwardly therefrom,
  (iv) a support shaft extending between and mounted on said actuator arms, said support shaft being fixed against rotation relative to said actuator arms while being free to slide radially with respect to said second axis, and
  (v) cam follower means mounted on said support shaft and engaging said cam track for movement therealong between a lowered position in which the cam followers are located at said lower end of said ramp section to a raised position which is more than 90° removed from said lowered position,
(c) a bait support platform mounted on said support shaft and extending generally radially therefrom, said platform being substantially horizontally disposed and extending to underlie said first axis when said support shaft is in said lowered position and being movable in response to movement of said actuator means to be initially ramped upwardly while remaining horizontally disposed and thereafter to pivot about said first axis through an arc of at least 90° whereby bait located on said platform is initially elevated to simultaneously contact the sharpened ends of a gang of hooks mounted on said hook support magazine and subsequently rotated in response to rotation of the bait support platform about said first axis to direct the bait around the crook-shaped end of the hooks to a sufficient extent to cause double-hooking, (d) a cutter blade assembly comprising,
  (i) a scabbard plate extending transversely between and mounted on said end plates for movement between a retracted position permitting unrestricted movement of said bait support platform and a bait cutting position underlying said platform,
  (ii) a plurality of cutter blades mounted on said scabbard plate fo movement from a sheathed position within said scabbard plate in an arc extending through said hooking station, one of said blades extending between each adjacent hooking location whereby bait which is hooked may be cut into individual bait portions after hooking.

10. A longline fish hook baiting assembly comprising,
(a) a plurality of fish hooks each having a body portion formed to provide a shank and a crook-shaped head portion extending in a first plane to a sharpened free end and a spacer projecting radially from the other end of said shank portion,
(b) a longline having a plurality of shank lines connected one to each hook,
(c) a hook support magazine having a hook mounting slipway opening inwardly from one end thereof, said slipway having upwardly and downwardly opening passages opening from said magazine, said slipway being adapted to slidably retain a plurality of said spacers,
(d) said slipway and spacer having complementary tongue and groove profiles, the profile which is found in the slipway extending laterally thereof and the profile which is found in the spacer extending transversely of the shank portion, said profiles being adapted to permit lengthwise movement of the spacer with respect to the slipway while preventing separation in a direction perpendicular to the slipway and rotation of the hooks about their shanks.

11. A fish hook storage magazine comprising, a frame having a slipway opening inwardly from one end thereof, said slipway having an upwardly opening passage opening from the magazine through which a shank of a hook may extend and a downwardly opening passage opening from the magazine through which a fishing line may depend from the magazine, said slipway extending longitudinally inwardly from said one end, opposite sides of said slipway being adapted to slidably mount a fish hook for movement along said slipway whereby a plurality of fish hooks may be mounted on said slipway of said magazine in a side-by-side relationship with their crook-shaped ends exposed for baiting and their fishing line depending from the magazine.

12. A fish hook storage magazine comprising, first and second guide rails having oppositely disposed first and second side edges extending parallel to one another in a spaced relationship to define a slipway therebetween which includes an upwardly opening passage, a downwardly opening passage, a downwardly opening passage, said slipway having an upwardly opening passage opening from the magazine through which a shank of a hook may extend and a downwardly opening passage opening from the magazine through which a fishing line may depend from the magazine, said slipway having first and second recesses in the first and second side edges respectively, said slipway being open at one end thereof whereby a plurality of fish hooks each having slipway mounting tabs may be loaded into and discharged from said slipway by way of said open end with their crook-shaped ends exposed above the slipway for baiting and their fishing line depending from the magazine and means for retaining said guide rails in said spaced relationship.

13. A fish hook comprising,
   (a) a body having a shank portion at one end thereof and a head portion extending in a first plane from the shank portion to a sharpened free end,
   (b) spacer means on said shank portion, said spacer means being secure against rotation about said shank portion having at least one lateral projection extending from said first plane whereby a plurality of fish hooks may be arranged in a side-by-side relationship will have their head portions spaced by engagement of the projections of adjacent spacer means, and at least one mounting shoulder formed in said spacer means, said mounting shoulders projecting in said first plane and being elongated in a second direction normal to said first plane to form a guide which is elongated in said second direction for slidably mounting said hook in a baiter with its head portion exposed for baiting.

14. A fish hook as claimed in claim 13 wherein said spacer means is T-shaped in said first plane, the T-shaped configuration thereby providing a pair of said mounting shoulders projecting in said first plane, one on either side of a leg portion in which a line mounting passage is formed.

15. A fish hook as claimed in claim 14 wherein a first of said shoulders is proportioned to be different from the second of said shoulders whereby in use said spacer means can only be operably located in one position to ensure correct alignment of the fish hook in use.

16. A fish hook as claimed in claim 13, wherein said spacer means is a unitary moulded plastic body in which one end of the shank portion is set.

17. A fish hook for use in a storage magazine having a hook mounting slipway, said hook comprising,
   (a) a body having a shank portion at one end thereof and a head portion extending in a first plane from the shank to a sharpened free end,
   (b) a tab mounted on the shank portion, said tab being secure against rotation about said shank portion, said tab having a pair of lateral projections extending one on each side of said first plane at a distance such that when two hooks are arranged side-by-side with their lateral projections abutting their head portions will be spaced a predetermined distance from one another, said tab being formed to provide a pair of mounting shoulders projecting in said first plane one on either side of a leg portion which extends normal to the shoulders, the shoulders being longitudinally elongated in a direction normal to said first plane to form a guide which is elongated in said direction and is adapted to be slidably mounted in said slipway.

18. A fish hook baiter comprising,
   (a) a hook support means adapted to support a gang of hooks in a side-by-side spaced relationship which is fixed for baiting with their hook ends free for baiting,
   (b) bait support means adapted to support bait during hooking of the bait,
   (c) guide means interconnecting said bait support means and said hook support means and adapted to permit relative movement therebetween along a baiting path whereby bait supported on the bait support means is applied to each of the hooks in the gang of hooks, said guide means comprising,
      (i) a frame having a pair of oppositely disposed end plates adapted to cooperate with said hook support means to locate said hook support means in a baiting station for supporting a plurality of hooks with their hooking axes aligned on a first axis extending between said end plates,
      (ii) a cam track formed on said end plates, said cam track having an arcuate section generated from said first axis, said arcuate section extending above said first axis and having an extension at one end thereof which projects to a level disposed a substantial distance below said first axis so as to form a ramp section which is upwardly inclined from its lower end to its arcuate section at a tangent thereto,
      (iii) a pair of actuator arms arranged one on each end plate, each actuator arm having a first end pivotally mounted on its adjacent end plate for rotation about said first axis and extending outwardly therefrom,
      (iv) a support shaft extending between and mounted on said actuator arms, said support shaft being fixed against rotation relative to said actuator arms while being free to slide radially with respect to said second axis and,
      (v) cam formward means mounted on said support shaft and engaging said cam track from movement therealong between a lowered position in which the cam followers are located at the lower end of the ramp section to a raised position which is more than 90 degrees removed from the lowered position.

19. A fish hook baiter as claimed in claim 18 wherein said bait support means comprises a bait support platform mounted on said support shaft and extending generally radially therefrom, said platform being substantially horizontally disposed and extending to underlie said first axis when said support shaft is in said lowered position and being movable in response to movement of said actuator means to be initially ramped upwardly while remaining horizontally disposed and thereafter to pivot about said first axis to an arc of at least 90 degrees whereby bait located on said platform is initially elevated to simultaneously contact the sharpened ends of a gang of hooks mounted on said hook support magazine in use and subsequently to rotate in response to rotation of the bait support platform about said axis to direct the bait around the crook-shaped end of the hooks to a sufficient extent to cause double-hooking.

20. A fish hook baiter comprising,
   (a) a hook support means adapted to support a gang of hooks in a side-by-side spaced relationship which is fixed for baiting with their hook ends free for baiting,
   (b) bait support means adapted to support bait during hooking of the bait,
   (c) guide means interconnecting said bait support means and said hook support means and adapted to permit relative movement therebetween along a baiting path whereby bait supported on the bait support means is applied to each of the hooks in the gang of hooks, (d) cutter means mounted for movement relative to said bait support means for cutting the bait, said cutter means comprising a cutter plate assembly which comprises,
  (i) a scabbard plate,
  (ii) a plurality of cutter plates mounted on said scabbard plate for movement from a sheathed position within said scabbard plate in an arc extending through said hooking station, one of said blades extending between each adjacent hooking location whereby bait which is hooked may be cut in individual bait portions after hooking.

* * * * *